(12) United States Patent
Junkin

(10) Patent No.: US 6,478,537 B2
(45) Date of Patent: Nov. 12, 2002

(54) PRE-SEGMENTED SQUEALER TIP FOR TURBINE BLADES

(75) Inventor: John Edward Junkin, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/785,879

(22) Filed: Feb. 16, 2001

(65) Prior Publication Data

US 2002/0136638 A1 Sep. 26, 2002

(51) Int. Cl.[7] .................................................. F01D 11/08
(52) U.S. Cl. ................ 415/173.1; 416/224; 416/241 R; 416/241 B
(58) Field of Search .......................... 416/224, 241 R, 416/241 B, 97 R, 92; 415/173.1, 173.4

(56) References Cited

U.S. PATENT DOCUMENTS

| | | | |
|---|---|---|---|
| 4,169,020 A | * | 9/1979 | Stalker et al. ................ 204/16 |
| 5,476,364 A | * | 12/1995 | Kildea .......................... 416/95 |
| 5,503,527 A | | 4/1996 | Lee et al. |
| 5,549,767 A | | 8/1996 | Pietruska |
| 5,660,523 A | | 8/1997 | Lee |
| 5,733,102 A | | 3/1998 | Lee |
| 5,738,491 A | * | 4/1998 | Lee et al. .................... 415/177 |
| 5,741,378 A | | 4/1998 | Pietruska |
| 5,780,171 A | | 7/1998 | Nissley |
| 5,902,093 A | | 5/1999 | Liotta |
| 5,972,424 A | | 10/1999 | Draghi |
| 5,997,251 A | * | 12/1999 | Lee .......................... 416/97 R |
| 6,004,101 A | | 12/1999 | Busbey et al. |
| 6,027,306 A | * | 2/2000 | Bunker ...................... 415/173.5 |
| 6,074,706 A | * | 6/2000 | Beverley et al. ............. 427/454 |

FOREIGN PATENT DOCUMENTS

GB             2324835          11/1998

* cited by examiner

Primary Examiner—Edward K. Look
Assistant Examiner—Igor Kershteyn

(57) ABSTRACT

A turbine blade having a pre-segmented squealer tip is provided. The segment or slots in the squealer tip are located in regions of maximum stress, and reduce cracking of the squealer tip and propagation of cracks into the airfoil. The slots are preferably filled with a corrosion resistant material which is more ductile than the base alloy.

17 Claims, 3 Drawing Sheets

PRE-SEGMENTED SQUEALER TIP FOR TURBINE BLADES

BACKGROUND OF THE INVENTION

1. Field of the Invention

The present invention relates generally to turbine blades having squealer tips, and more specifically to a turbine blade squealer tip with segments or slots placed in positions of maximum stress.

2. Description of the Prior Art

Combustion turbine power plants, generally, have three main assemblies: a compressor assembly, a combustor assembly, and a turbine assembly. A transition section is located between the combustor assembly and the turbine assembly. In operation, ambient air is drawn into the engine and compressed by the compressor assembly. The compressed air is channeled into the combustor assembly where it is mixed with a fuel, and the compressed air-fuel mixture is then ignited to create a heated working gas. The heated working gas passes through the transition section and into the turbine assembly.

The compressor and turbine stages of the engine include a plurality of turbine blades that are mounted on a common rotating shaft. Each blade is fixed on a rotor disk and extends radially outward with the airfoil to culminate in a tip that is in close proximity to the blade rim. The compressor and turbine stages each additionally include one or more stationary vanes or stators that include non-moving turbine blades and that cooperate with the turbine blades mounted on the rotating shaft to compress air and to derive mechanical power from high velocity gases. Turbine blades and vanes are thus exposed to a high stress environment which can include mechanical, thermal and rotational stressors. In many cases, the thermal stress at the turbine blade tip is the most significant due to the high temperature gradients during transient conditions.

While higher temperatures are required to provide greater engine efficiency, factors which limit the operation temperature include the materials of which the blades and other components are made, and the ability to provide a cooling means to these components. Blades are thus cast to include hollow channels through which a coolant medium can be passed. These hollow channels form the core of the blade. The hollow cavity receives cooling air during operation of the combustion engine to provide a cooling effect to the blades and to control the operating temperature thereof.

The core section of the blade includes an end cap proximate the tip that has a peripheral land encircling it, that on the outer surface forms an extension of the airfoil and on its inner surface defines a groove. The land portion of the airfoil is generally referred to as the squealer tip. Squealer tips are typically found on first and second stage turbine blades, and are generally used on turbine blades to increase efficiency and reduce the loss of hot gas over the tip of the blade. Squealer tips are designed to minimize the distance between the blade and the ring segment surrounding the blade, thus reducing the loss of hot gas.

However, squealer tips are difficult to cool, because cooling air within the interior cavity of the airfoil does not reach the tip. Analysis of currently designed turbine blades shows that the squealer tip is likely to crack during service operation. These cracks are in a radial direction and are slow to propagate. While some radial tip cracking is acceptable, blades are routinely removed from service when the radial tip crack limit is reached. If a crack breaches the internal cooling channel, the cooling air may leak therethrough and adversely affect the intended cooling of the blade.

Due to the high cost of high performance hot section turbine components, it is desirable to repair such components and prolong as much as possible the life of blade tips and the respective blades rather than replace them. Prevention of cracks in the squealer tip can ultimately prevent propagation of these cracks into the airfoil. This is highly desirable, as repair of blades with cracks that extend into the core cavity is very expensive. A variety of methods currently exist for preventing these cracks.

U.S. Pat. No. 5,902,093 discloses an air foil which includes a serpentine cooling circuit extending inside the air foil for channeling the cooling air and thus cooling the blade during operation. The cooling method of this invention is intended to prevent propagation of radial cracks.

U.S. Pat. No. 5,972,424 discloses a method for repairing a gas turbine engine component coated with a thermal barrier coating system. The coating is intended to prevent cracks that develop in the ceramic topcoat from propagating into the blade.

U.S. Pat. No. 5,733,102 and U.S. Pat. No. 5,660,523 relate to a turbine blade squealer tip with an end cap having cooling holes to permit passage of cooling air from the interior of the blade through the end cap. The '102 patent optionally provides a thermal barrier coating on an outward side of the squealer tip to provide insulation against the combustion gas.

There is a further need to provide suitable methods for prevention of radial cracks in regions of maximum stress in the squealer tip, and to prevent propagation of these cracks into the body of the airfoil.

SUMMARY OF THE INVENTION

The present invention solves the above problem by providing stress relief in blade squealer tips in locations that are susceptible to radial tip cracks. The stress relief is provided by means of segments or slots which are machined into the blade during manufacture, in regions that are determined to be of high thermal stress during operation. Such a pre-segmented or slotted squealer tip blade can remain in service for longer periods of time than a similar blade that does not have a pre-segmented or slotted squealer tip. In addition, once a pre-segmented squealer tip blade is submitted for repair, the repair scope will be less extensive than a blade that does not have a pre-segmented squealer tip. The present invention will result in reduced time and costs of gas turbine outages as well as reduced costs and higher yield; more blades can be returned to service after the blade repair process. The present invention also reduces the risk of unacceptable crack propagation into the airfoil during service.

It is an object of the present invention therefore to provide pre-segmented squealer tips in turbine blades which can resist formation and propagation of cracks.

Its is a further object of the present invention to provide pre-segmented squealer tips of turbine blades having slots located in regions of maximum stress.

It is an additional object of the present invention to provide a pre-segmented squealer tip of a turbine blade which reduces the cost of repairing damaged turbine blades.

These and other objects of the present invention will be apparent from the following description, drawings and the appended claims.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE INVENTION

The present invention provides a blade for a combustion turbine having an airfoil that radially extends from a root, designed to be fixed on a rotor disk formed on an extended shaft, out to a tip. The tip has one or more slots machined in its end, and these slots are placed substantially at points of maximum stress on the tip. This invention can also have application to other kinds of turbines that incorporate blades which undergo large stressors at the tips.

Figure 1:
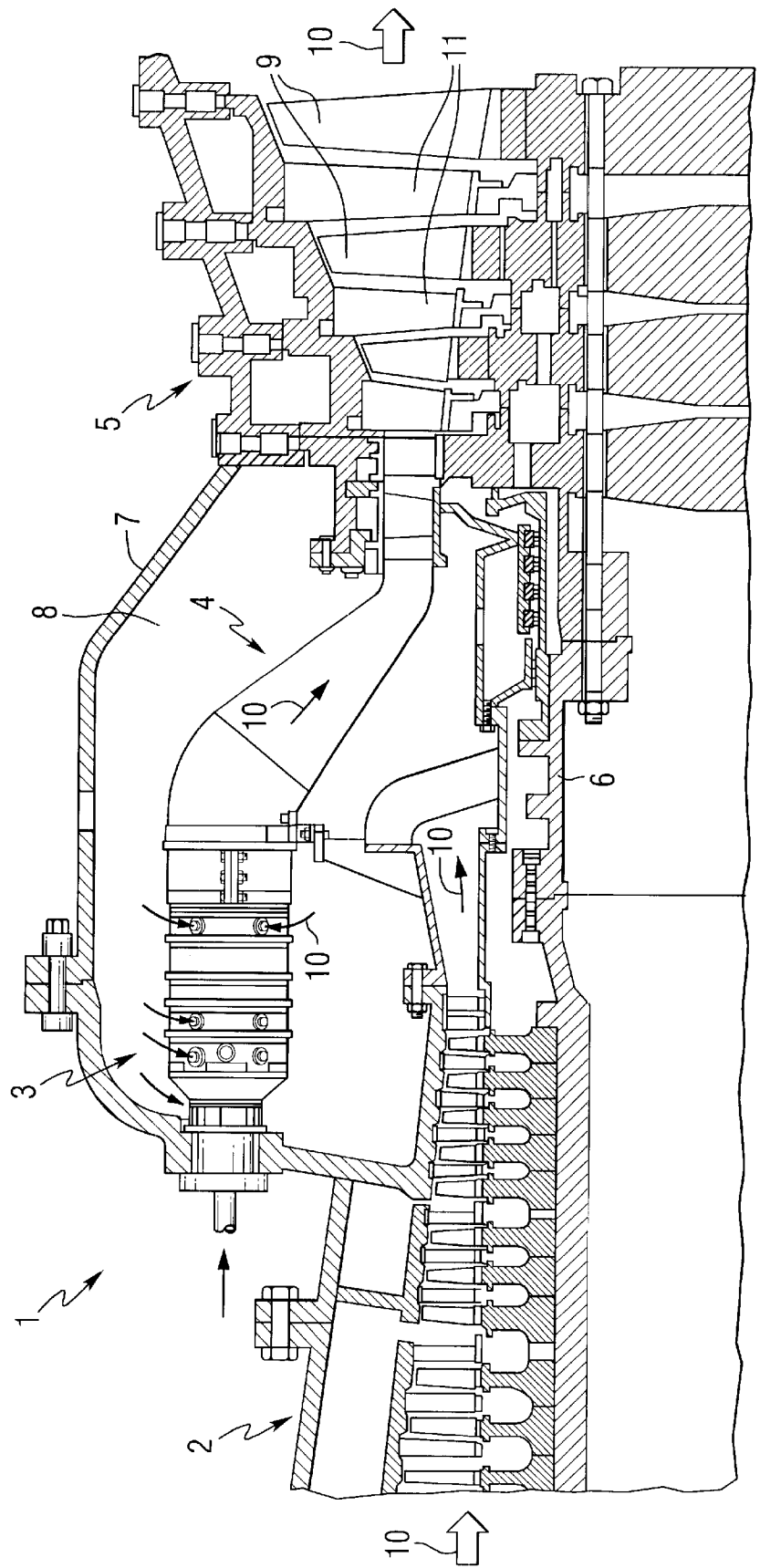
FIG. 1 is a schematic view of a combustion gas turbine engine.

As is well known in the art and shown in FIG. 1, a combustion turbine includes a compressor assembly 2, a plurality of combustor assemblies 3, a transition section 4 for each combustor assembly, and a turbine assembly 5. A flow path 10 exists through the compressor 2, combustor assemblies 3, transition section 4, and turbine assembly 5. The turbine assembly 5 is mechanically coupled to the compressor assembly 2 by a central shaft 6. Typically, an outer casing 7 encloses a plurality of combustor assemblies 3 and transition sections 4. Outer casing 7 creates a compressed air plenum 8. The combustor assemblies 3 and transition sections 4 are disposed within the compressed air plenum 8, circumferentially about the central shaft 6.

In operation, the compressor assembly 2 inducts ambient air and compresses it. The compressed air travels through the flow path 10 to the compressed air plenum 8 defined by casing 7. Compressed air within the compressed air plenum 8 enters a combustor assembly 3 where the compressed air is mixed with a fuel and ignited to create a working gas. The working gas passes from the combustor assembly 3 through transition section 4 and into the turbine assembly 5. In the turbine assembly 5 the working gas is expanded through a series of rotatable blades 9 which are attached to shaft 6 and the stationary vanes 11. As the working gas passes through the turbine assembly 5, the blades 9 and shaft 6 rotate creating a mechanical force. The shaft of the turbine assembly 5 can be coupled to a generator to produce electricity.

Figure 2:
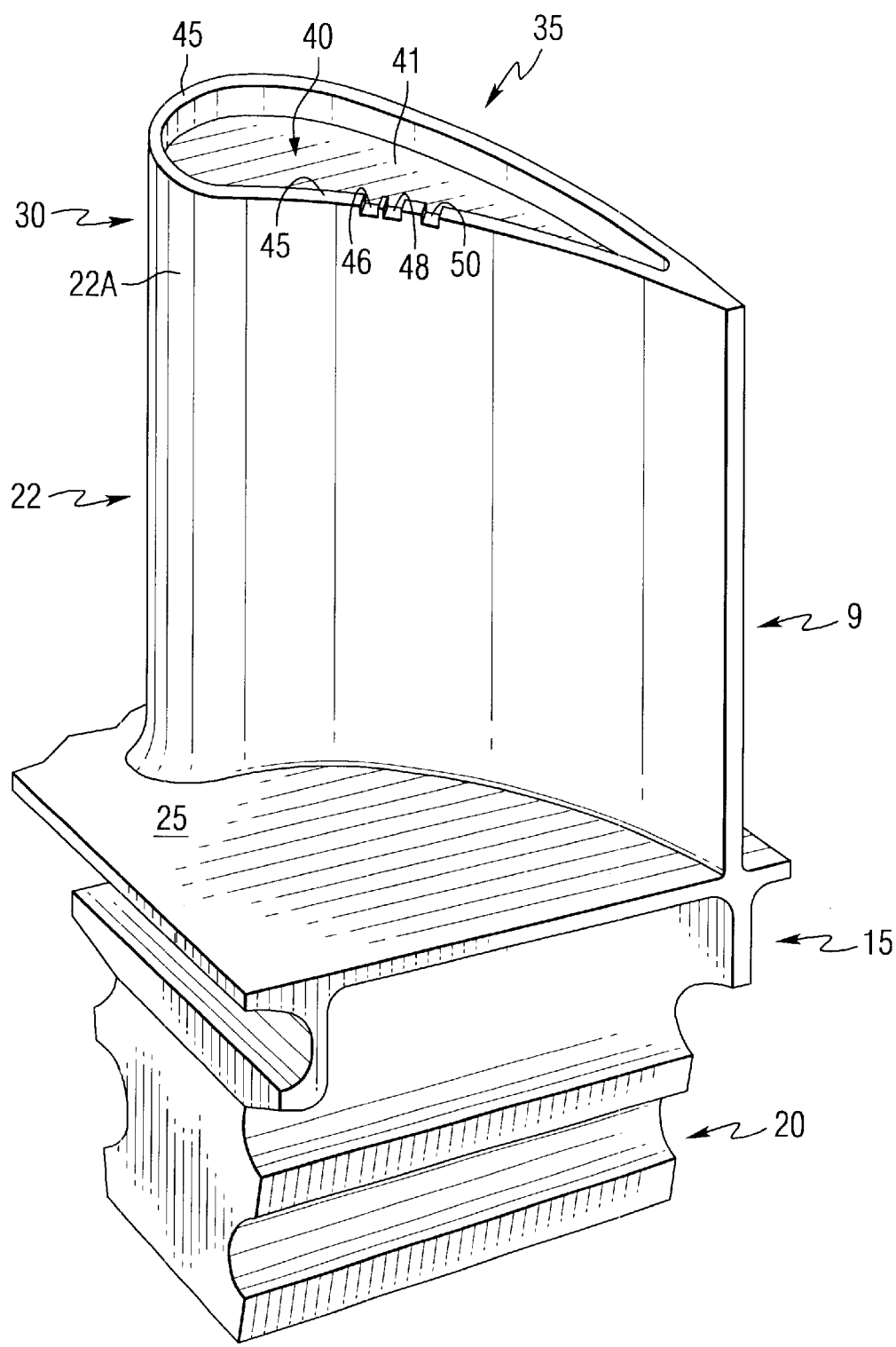
FIG. 2 is a perspective view of a turbine blade having a squealer tip with slots in the end cap of the blade.

FIG. 2 shows a turbine engine hollow rotor blade, designated by the numeral 9. The blade 9 includes an airfoil 22, and a base 15 mounting the airfoil 22 to a rotor (not shown) of the engine (not shown). The base 15 has a platform 25 rigidly mounting the airfoil 22 and a dove tail root 20 for attaching the blade 22 to the rotor.

At an outer end portion 30, the airfoil 22 of the blade 9 has a squealer tip 35. The squealer tip 35 includes an end cap 40 which closes the outer end portion 30 of the core of the hollow portion of the blade 9, and an end wall 45 attached to and extending along the periphery 22A of, and projecting outwardly from, the end cap 40 so as to define a cavity 41 therewith. The end cap 40 of the squealer tip 35 is provided with slots 46, 48 and 50, placed in regions of maximum stress.

During the initial design of a blade, prior to manufacture of the blade, a detailed stress analysis using finite 3-dimensional stress analysis computer programs such as PATRAN, ANSYS or other similar commercially available programs, will indicate precisely where regions of high thermal stress are likely to occur during operation. A computer model of the blade is made, specifying blade dimensions, materials and other properties of the blade. Boundary conditions, such as temperature experienced by various sections of the blade, as well as gas bending loads and centrifugal force loads, are also inputted into the model. A stress analysis of the model is run, with specific attention paid to the tip region of the blade. The analysis provides, as an output, a contour plot indicating regions of high stress in the tip region. High stress is defined as those regions or locations having thermal stress which is 80% or higher of the yield stress of the blade's base alloy.

After the initial analysis, the computer model can be modified to include a small number of slots in the tip, in the regions previously identified as high stress. The analysis is rerun to determine the reduction in stress due to the slots. If the amount of stress reduction is less than that desired, additional slots can be drawn into the model and the analysis run again. An iterative process is thus used during the analysis to determine the optimum number and spacing of the slots. Additionally, slots can be placed in regions of the tip known to crack during the life of the blade.

The slots in the squealer tip can be machined in, in regions of high stress as determined by the analysis, during manufacture of the blade by any suitable method, including EDM, water jet, mechanical grinding or any other method known to those skilled in the art. The spacing and number of slots will depend on the type of blade and the location of high thermal stress regions, and on the expected reduction in stress as determined by the analysis. The slots are machined to a maximum depth that would correspond to the depth of the squealer tip and which does not extend beyond an elevation corresponding to the outer surface of the end cap 40. Thus the depth will depend on squealer tip height for the particular blade. The width of the slots will range from about 10 thousands of an inch to 25 thousands of an inch, more preferably about 20 thousands of an inch in width. The preferred width will depend on manufacturing techniques and capabilities, as well as the results of the stress analysis. Blades having more regions of high stress will require placement of more slots than those having fewer regions of high stress. Spacing of slots will not necessarily be even, and will be determined by blade and squealer tip geometry, manufacturing capabilities and analysis results.

Preferably, an oxidation and corrosion-resistant filler material such as an MCrAlY or other material can be used to fill the notches and minimize working gas bypass. The MCrAlY is more ductile and compliant than the base alloy and can withstand higher thermal stress than the base alloy. Such a filler also provides flexibility in the squealer tip, increasing the ability of the tip to resist formation and propagation of cracks. The filler will also provide a barrier against loss of working fluid gas over the blade tip. The MCrAlY coating can be applied using any currently accepted industry standard methods such as plasma spray, low pressure plasma spray, HVOF and other acceptable methods.

Figure 3:
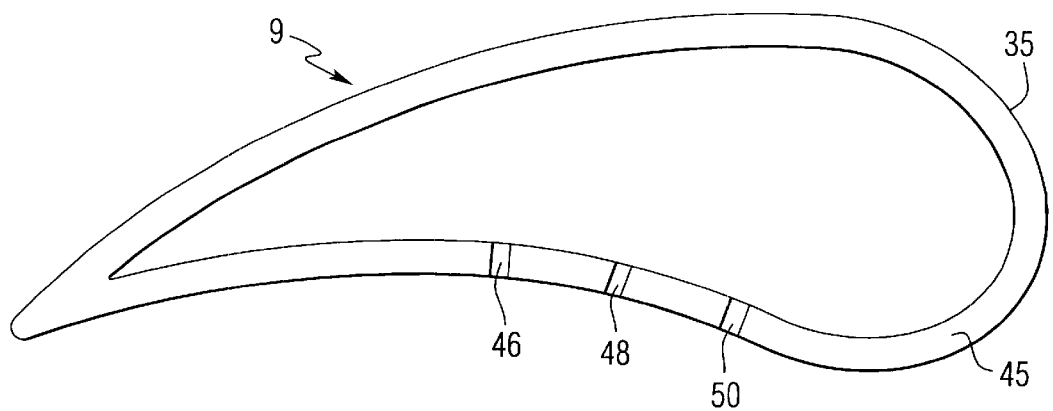
FIG. 3 is a top plan view of a pre-segmented squealer tip on a turbine blade in an embodiment of the present invention, showing location of the slots.

Slots can be machined anywhere on the squealer tip of the blade where high stress is likely to occur. For example, certain blades may experience high stress on the high pressure side of the blade as in FIG. 3. FIG. 3 shows a top view of a hypothetical blade 9 embodying this invention, having slots 46, 48, 50 in the end wall 45 of the squealer tip 35.

Figure 4:
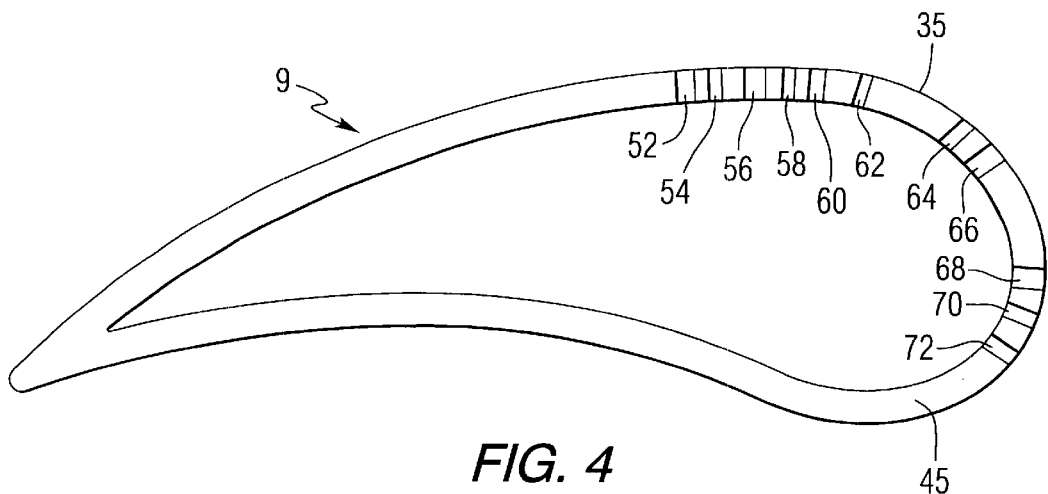
FIG. 4 is a top plan view of an additional embodiment of a pre-segmented squealer tip having a different placement of the slots.

Other blades may have the configuration of slots shown in FIG. 4, in which the points of maximum stress occur on the low pressure side of the blade. FIG. 4 illustrates an additional embodiment of a pre-segmented squealer tip of the present invention, with a top view of the hypothetical blade 9 having slots 52–72 in the end wall 45 of the squealer tip 35. As will be appreciated by those skilled in the art, other variations in placement of the slots will be possible, and are considered within the scope of the present invention.

Figure 5:
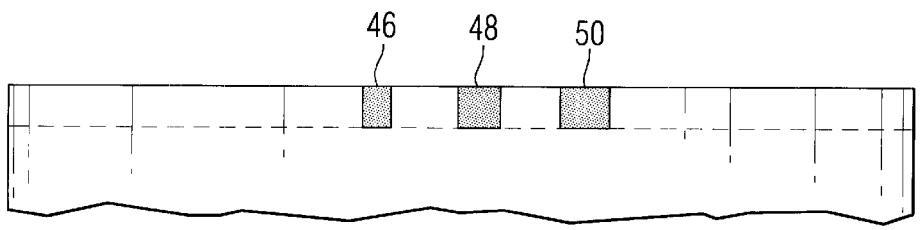
FIG. 5 is a partial side view showing slots in the end wall of the squealer tip.

FIG. 5 shows a side view of the slots, filled with a ductile, corrosion-resistant material such as an MCrAlY. After the MCrAlY or similar material is used to fill the slots, the blade can be further coated with a thermal barrier coating.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A turbine blade comprising an airfoil, said airfoil comprised of a base alloy and radially extending from a root designed to be fixed on a rotor shaft out to a squealer tip, the squealer tip having one or more slots machined in its end, and wherein said one or more slots are placed substantially at points of maximum stress on the squealer tip, wherein said one or more slots penetrate said squealer tip, said one or more slots extending between an outer surface of the air foil and an interior cavity of said squealer tip.

2. The blade of claim 1, wherein said one or more slots are filled with a highly oxidation and corrosion resistant material which is more ductile than the base alloy.

3. The blade of claim 2, wherein the oxidation and corrosion resistant material is an MCrAlY.

4. The blade of claim 2, wherein a bond is created between said oxidation and corrosion resistant material and said base alloy.

5. The blade of claim 4, wherein said bond is created by spray coating said oxidation and corrosion resistant material on said base alloy.

6. The blade of claim 1, wherein said one or more slots are from about 10 thousandths to 25 thousandths of an inch in width.

7. The blade of claim 1, wherein said one or more slots are about 20 thousandths of an inch in width.

8. The turbine blade of claim 1, wherein the turbine blade is a combustion gas turbine blade.

9. A turbine engine comprising a blade, said blade comprising an airfoil, said airfoil comprised of a base alloy and radially extending from a root designed to be fixed on a rotor shaft out to a squealer tip, the squealer tip having one or more slots machined in its end, and wherein said one or more slots are placed substantially at points of maximum stress on the squealer tip, wherein said one or more slots penetrate said squealer tip, said one or more slots extending between an entry surface of the air foil and an interior cavity of said squealer tip.

10. The turbine engine of claim 9, wherein said one or more slots are filled with a highly oxidation and corrosion resistant material which is more ductile than the base alloy.

11. The turbine engine of claim 10, wherein the oxidation and corrosion resistant material is an MCrAlY.

12. The turbine engine of claim 10, wherein a bond is created between said oxidation and corrosion resistant material and said base alloy.

13. The turbine engine of claim 12, wherein said bond is created by spray coating said oxidation and corrosion resistant material on said base alloy.

14. The turbine engine of claim 9, wherein said one or more slots are from about 10 thousandths to 25 thousandths of an inch in width.

15. The turbine engine of claim 9, wherein said one or more slots are about 20 thousandths of an inch in width.

16. The turbine engine of claim 9, wherein the turbine engine is a combustion gas turbine engine.

17. A power plant incorporating a turbine engine comprising a blade, said blade comprising an airfoil, said airfoil comprised of a base alloy and radially extending from a root designed to be fixed on a rotor shaft out to a squealer tip, the squealer tip having one or more slots machined in its end, and wherein said one or more slots are placed substantially at points of maximum stress on the squealer tip, wherein said one or more slots penetrate said squealer tip, said one or more slots extending between an outer surface of the airfoil and an interior cavity of said squealer tip.

* * * * *